US012639802B2

(12) United States Patent
Zhang et al.

(10) Patent No.: US 12,639,802 B2
(45) Date of Patent: May 26, 2026

(54) METHOD AND APPARATUS OF TRAINING IMAGE RECOGNITION MODEL, AND METHOD OF DETECTING DISPLAY SUBSTRATE

(71) Applicant: BOE Technology Group Co., Ltd., Beijing (CN)

(72) Inventors: Qing Zhang, Beijing (CN); Quanguo Zhou, Beijing (CN); Jiuyang Cheng, Beijing (CN); Lijia Zhou, Beijing (CN); Zhidong Wang, Beijing (CN); Hao Tang, Beijing (CN); Meng Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 370 days.

(21) Appl. No.: 18/274,232

(22) PCT Filed: Sep. 21, 2022

(86) PCT No.: PCT/CN2022/120131
§ 371 (c)(1),
(2) Date: Jul. 26, 2023

(87) PCT Pub. No.: WO2023/093243
PCT Pub. Date: Jun. 1, 2023

(65) Prior Publication Data
US 2024/0070848 A1 Feb. 29, 2024

(30) Foreign Application Priority Data
Nov. 29, 2021 (CN) .......................... 202111439411.7

(51) Int. Cl.
*G06T 7/00* (2017.01)
*G06T 7/70* (2017.01)
*G06V 10/774* (2022.01)

(52) U.S. Cl.
CPC ................ *G06T 7/001* (2013.01); *G06T 7/70* (2017.01); *G06V 10/774* (2022.01);
(Continued)

(58) Field of Classification Search
CPC . G06T 7/001; G06T 7/70; G06T 2207/20021; G06T 2207/20081;
(Continued)

(56) References Cited

U.S. PATENT DOCUMENTS

2018/0114095 A1* 4/2018 Han ..................... G06F 16/5866
2020/0320680 A1* 10/2020 Yamagami .............. G06T 7/001

FOREIGN PATENT DOCUMENTS

CN 103809309 A 5/2014
CN 107390404 A 11/2017
(Continued)

OTHER PUBLICATIONS

Machine translation for CN 110349145 (Year: 2019).*
(Continued)

*Primary Examiner* — Qian Yang
(74) *Attorney, Agent, or Firm* — WHDA, LLP

(57) ABSTRACT
Provided is a method of training an image recognition model, the model is configured to detect a defect region in an image of a display substrate, the display substrate includes a display area and a connection area, and the method includes: acquiring a first training sample including images of n display substrates; dividing each of the images of n display substrates into a first sub image and a second sub image, the first sub image is an image of a display area, and the second sub image is an image of a connection area; inputting the first training sample into the image recognition model, the first training sample includes the first sub image and the second sub image; and adjusting at least one feature parameter of the image recognition model to reduce a
(Continued)

difference between an output value of the model and a training value of the first training sample.

14 Claims, 7 Drawing Sheets

(52) U.S. Cl.
    CPC .............. *G06T 2207/20021* (2013.01); *G06T 2207/20081* (2013.01); *G06T 2207/30108* (2013.01); *G06T 2207/30204* (2013.01)

(58) Field of Classification Search
    CPC . G06T 2207/30108; G06T 2207/30204; G06T 7/0004; G06T 7/11; G06T 7/136; G06T 2207/20104; G06T 2207/30121; G06V 10/774; G06V 10/25; G06V 10/26; G06V 10/56; G06V 10/454; G06V 10/82; G06F 18/214; G06F 18/24
    See application file for complete search history.

(56) References Cited

FOREIGN PATENT DOCUMENTS

| CN | 110349145 | * | 10/2019 |
|---|---|---|---|
| CN | 111061104 | A | 4/2020 |
| CN | 111291841 | * | 6/2020 |
| CN | 111854963 | * | 10/2020 |
| CN | 112884744 | A | 6/2021 |
| CN | 113176281 | A | 7/2021 |
| CN | 113674232 | * | 11/2021 |
| CN | 114119566 | A | 3/2022 |
| JP | 2006-058161 | A | 3/2006 |
| JP | 2011-022100 | A | 2/2011 |
| JP | 2013-246158 | A | 12/2013 |
| JP | 2015-179984 | * | 10/2015 |
| KR | 20210122410 | A | 10/2021 |

OTHER PUBLICATIONS

Machine translation for CN 111061104, IDS (Year: 2020).*
Machine translation for CN 111854963 (Year: 2020).*
Machine translation for JP 2015-179984 (Year: 2015).*
Machine translation for CN 113674232 (Year: 2021).*
Machine translation for CN 111291841 (Year: 2020).*
English translation of International Search Report dated Nov. 28, 2022, issued in counterpart Application No. PCT/CN2022/120131. (2 pages).
Office Action dated May 24, 2025, issued in couterpart CN Application No. 202111439411.7, with English translation. (18 pages).
Haddad, B. et al., Locally Adaptive Statistical Background Modeling With Deep Learning-Based False Positive Rejection for Defect Detection in Semiconductor Units, Transactions on Semiconductor Manufacturing, vol. 33, No. 3, p. 357-372, Aug. 2020. (16 pages); cited in CN Office Action dated May 24, 2025.
Cheng, L., Research and design of TFT defect detection system based on machine vision, Soochow University, Sep. 2019, with English Abstract; cited in CN Office Action dated May 24, 2025.

* cited by examiner

<u>10</u>

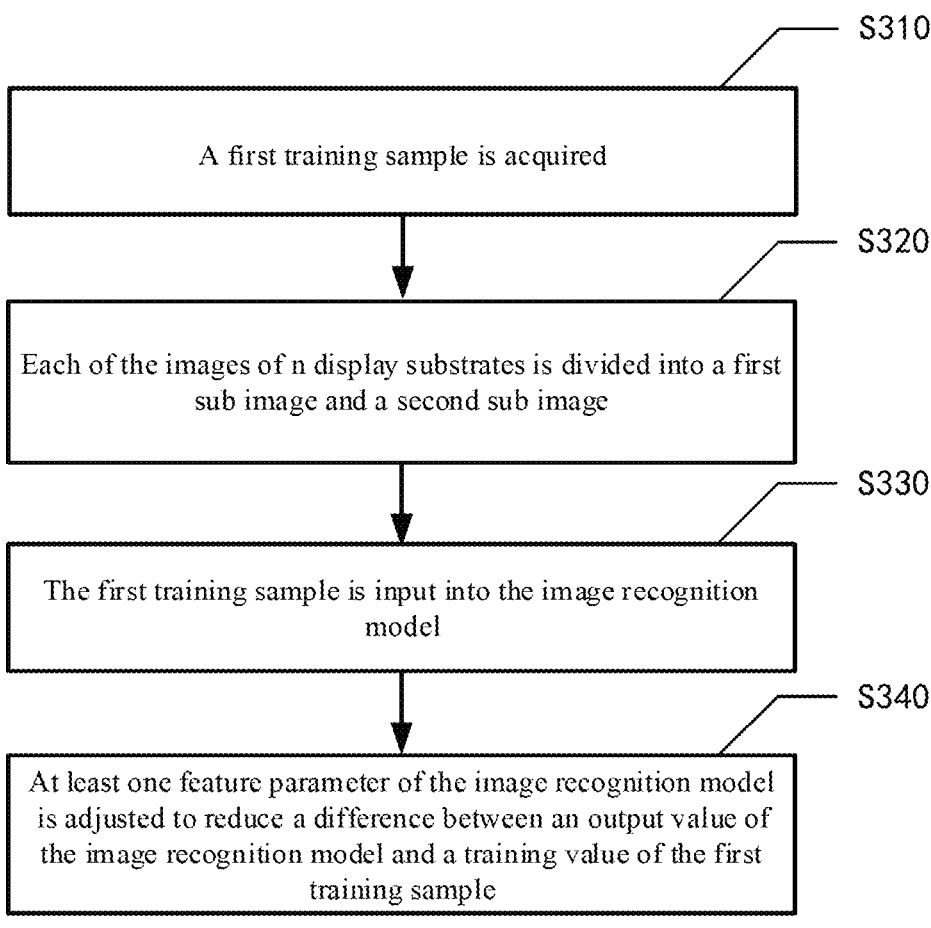

S310

A first training sample is acquired

S320

Each of the images of n display substrates is divided into a first sub image and a second sub image

S330

The first training sample is input into the image recognition model

S340

At least one feature parameter of the image recognition model is adjusted to reduce a difference between an output value of the image recognition model and a training value of the first training sample

FIG. 3

METHOD AND APPARATUS OF TRAINING IMAGE RECOGNITION MODEL, AND METHOD OF DETECTING DISPLAY SUBSTRATE

CROSS REFERENCE TO RELATED APPLICATION

This application is a Section 371 National Stage Application of International Application No. PCT/CN2022/120131, filed on Sep. 21, 2022, entitled "METHOD AND APPARATUS OF TRAINING IMAGE RECOGNITION MODEL, AND METHOD OF DETECTING DISPLAY SUBSTRATE", which claims priority to Chinese Application No. 202111439411.7, filed on Nov. 29, 2021, the entire content of which is incorporated herein by reference in its entirety.

TECHNICAL FIELD

The present disclosure relates to a field of artificial intelligence technology, and in particular, to a method and apparatus of training an image recognition model, a device, a non-transitory computer readable storage medium, a program product, and a method of detecting a display substrate.

BACKGROUND

OLED (Organic Light-Emitting Diode) is a type of current type organic light emitting device, which is a phenomenon that emits luminescence through the injection and recombination of carriers, and an emission intensity is proportional to an injected current. OLED display device is a type of display device that uses luminescent OLED to display information such as an image. The OLED display device has characteristics such as low power consumption, high brightness, and high response speed. During a manufacturing process of the OLED display device, a defect such as a foreign object, a bubble, a puncture, and the like may occur. Therefore, it is necessary to conduct more accurate detection of these defects to help optimize a process flow of the display device and improve a product yield of the display device.

The above information disclosed in this section is only for an understanding of the background of the inventive concept of the present disclosure, and therefore, the above information may contain information that does not constitute the prior art.

SUMMARY

In view of the above-mentioned problems, the present disclosure provides a method and apparatus of training an image recognition model, a device, a non-transitory computer readable storage medium, a program product, and a method of detecting a display substrate.

According to a first aspect of the present disclosure, there is provided a method of training an image recognition model, wherein the image recognition model is configured to detect a defect region in an image of a display substrate, the display substrate includes a display area and a connection area, and the method includes:

acquiring a first training sample, wherein the first training sample includes images of n display substrates, and n is a positive integer greater than or equal to 1;

dividing each of the images of n display substrates into a first sub image and a second sub image, wherein the first sub image is an image of a display area of the display substrate, and the second sub image is an image of a connection area of the display substrate;

inputting the first training sample into the image recognition model, wherein the first training sample includes the first sub image and the second sub image; and adjusting at least one feature parameter of the image recognition model to reduce a difference between an output value of the image recognition model and a training value of the first training sample, wherein the image recognition model includes a first parameter and a second parameter, wherein the first parameter is related to a gray scale difference between a normal region and a defect region in the first sub image, the second parameter is related to a gray scale difference between a normal region and a defect region in the second sub image, and the at least one feature parameter includes at least one of the first parameter and the second parameter.

According to some exemplary embodiments, the method further includes:

acquiring a second training sample, wherein the second training sample includes images of m display substrates, m is a positive integer greater than or equal to 1, and the images of m display substrates are images of missed detection of the image recognition model; and inputting the second training sample into the image recognition model to optimize the image recognition model.

According to some exemplary embodiments, the at least one feature parameter further includes a boundary threshold parameter, wherein the boundary threshold parameter is configured to represent a boundary of a detection region of the display substrate in the image of the display substrate, and the detection region includes a display area and a connection area of the display substrate.

According to some exemplary embodiments, the at least one feature parameter further includes a position parameter of a region of interest, wherein the position parameter includes a coordinate position of at least one vertex of the region of interest in the image of the display substrate, and a length and a width of the region of interest.

According to some exemplary embodiments, the first parameter is calculated by:

$$P = a \times R \times OFS,$$

where P is the first parameter, a is a constant, R is a mean square deviation ratio of each defect in the image of the display substrate, and OFS is a difference value of each defect in an image block.

According to some exemplary embodiments, the second parameter is calculated by:

$$Q = QM_1 / QM_2,$$

where Q is the second parameter, $QM_1$ is a gray scale threshold of a defect in the connection area, and $QM_2$ is a gray scale threshold of a background in the connection area.

According to some exemplary embodiments, the display substrate further includes a plurality of first positioning markers arranged in the display area and a plurality of second positioning markers arranged in the connection area, wherein the dividing each of the images of n display substrates into a first sub image and a second sub image includes:

determining positions of the plurality of first positioning markers and positions of the plurality of second positioning markers in the image of the display substrate; and dividing the image of the display substrate into the first sub image and the second sub image according to the positions of the plurality of first positioning markers and the positions of the plurality of second positioning markers in the image of the display substrate.

According to some exemplary embodiments, before the inputting the first training sample into the image recognition model, the method further includes: segmenting the first sub image into a plurality of image blocks and segmenting the second sub image into a plurality of image blocks according to a gray scale value difference threshold, wherein the at least one feature parameter includes the gray scale value difference threshold, and the first training sample includes the plurality of image blocks of the first sub image and the plurality of image blocks of the second sub image.

According to some exemplary embodiments, the method further includes adjusting the gray scale value difference threshold according to a category of a defect.

According to some exemplary embodiments, the inputting the second training sample into the image recognition model to optimize the image recognition model includes:

inputting the second training sample into the image recognition model; and adjusting a training parameter of the image recognition model to optimize the image recognition model, wherein the training parameter includes at least one of: a number of training samples input into the image recognition model each time, and a number of cycles during a training process.

According to some exemplary embodiments, before the inputting the second training sample into the image recognition model, the method further includes:

classifying the images of m display substrates in the second training sample according to a reason for missed detection; and marking missed defects differently in the images of m display substrates according to categories of the images of m display substrates.

According to some exemplary embodiments, the method further includes: comparing a gray scale value of the missed defect with a gray scale value of the normal region and comparing a gray scale value of the missed defect with a gray scale value of the defect region according to categories of the images of m display substrates; and adjusting the training parameter of the image recognition model according to a result of the comparison, wherein the training parameter includes a gray scale threshold for image segmentation.

According to a second aspect of the present disclosure, there is provided a method of detecting a display substrate, including:

acquiring an image of the display substrate;

inputting the image of the display substrate into an image recognition model, wherein the image recognition model is obtained according to the method described above; and determining a detection result of a defect in the display substrate according to an output result of the image recognition model.

According to a third aspect of the present disclosure, there is provided an apparatus of training an image recognition model, wherein the image recognition model is configured to detect a defect region in an image of a display substrate, the display substrate includes a display area and a connection area, and the apparatus includes:

an acquisition module configured to acquire a first training sample, wherein the first training sample includes images of n display substrates, and n is a positive integer greater than or equal to 1;

a division module configured to divide each of the images of n display substrates into a first sub image and a second sub image, wherein the first sub image is an image of a display area of the display substrate, and the second sub image is an image of a connection area of the display substrate;

an input module configured to input the first training sample into the image recognition model, wherein the first training sample includes the first sub image and the second sub image; and an adjustment module configured to adjust at least one feature parameter of the image recognition model to reduce a difference between an output value of the image recognition model and a training value of the first training sample, wherein the image recognition model includes a first parameter and a second parameter, wherein the first parameter is related to a gray scale difference between a normal region and a defect region in the first sub image, the second parameter is related to a gray scale difference between a normal region and a defect region in the second sub image, and the at least one feature parameter includes at least one of the first parameter and the second parameter.

According to a fourth aspect of the present disclosure, there is provided an electronic device, including:

one or more processors; and a storage apparatus configured to store one or more programs, wherein the one or more programs, when executed by the one or more processors, cause the one or more processors to implement the method described above.

According to a fifth aspect of the present disclosure, there is provided a non-transitory computer readable storage medium having executable instructions stored thereon, wherein the instructions, when executed by a processor, cause the processor to implement the method described above.

According to a sixth aspect of the present disclosure, there is provided a computer program product including a computer program, wherein the computer program, when executed by a computer, is allowed to implement the method described above.

BRIEF DESCRIPTION OF DRAWINGS

The above contents and other objectives, features and advantages of the present disclosure will become more apparent through the following description of embodiments of the present disclosure with reference to the accompanying drawings.

FIG. 3 shows a flowchart of a method of training an image recognition model according to embodiments of the present disclosure.

5

6

Figures 4, 5:
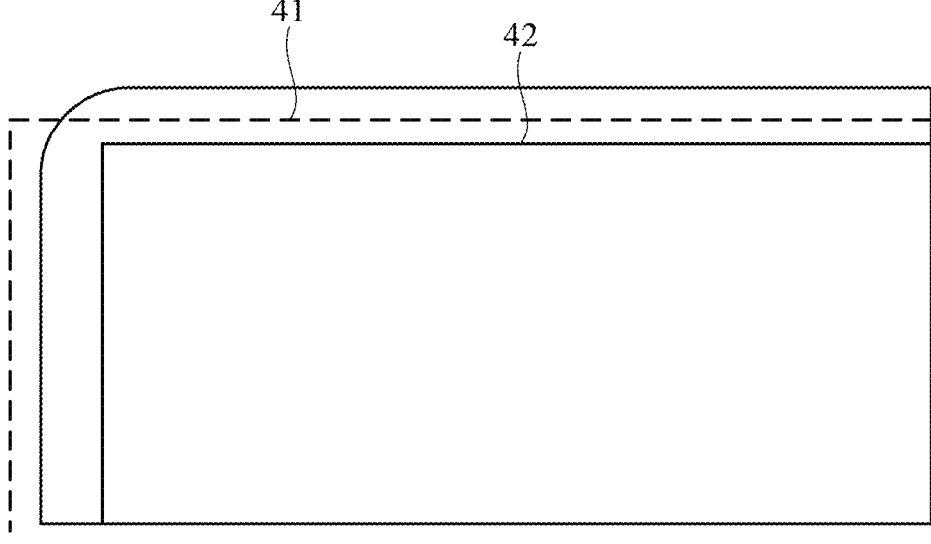

FIG. 4 schematically shows a portion of a boundary of a detection region of the display substrate in an image of the display substrate.

FIG. 5 schematically shows a region of interest on an image of the display substrate.

Figure 6:
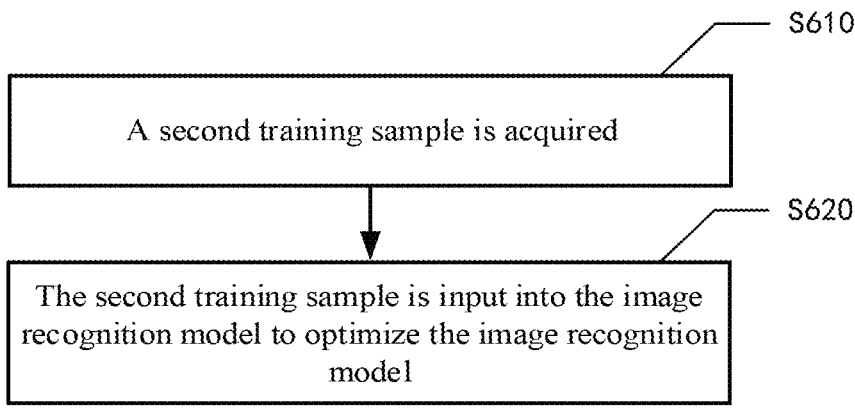

FIG. 6 shows a partial flowchart of a method of training an image recognition model according to embodiments of the present disclosure.

Figure 7:
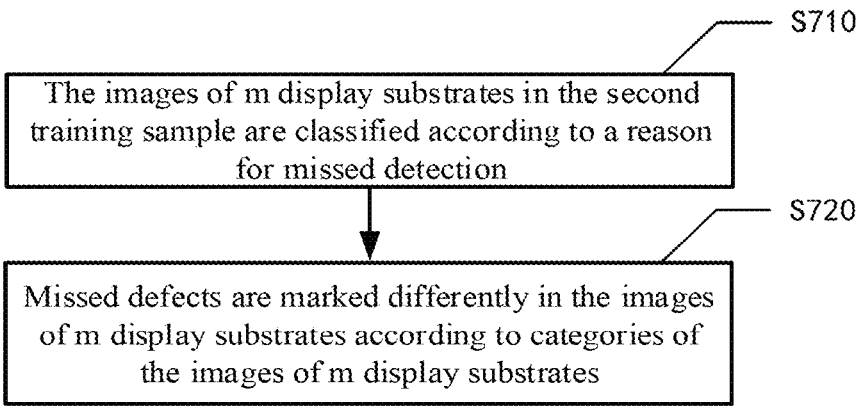

FIG. 7 shows a partial flowchart of a method of training an image recognition model according to embodiments of the present disclosure.

Figure 8:
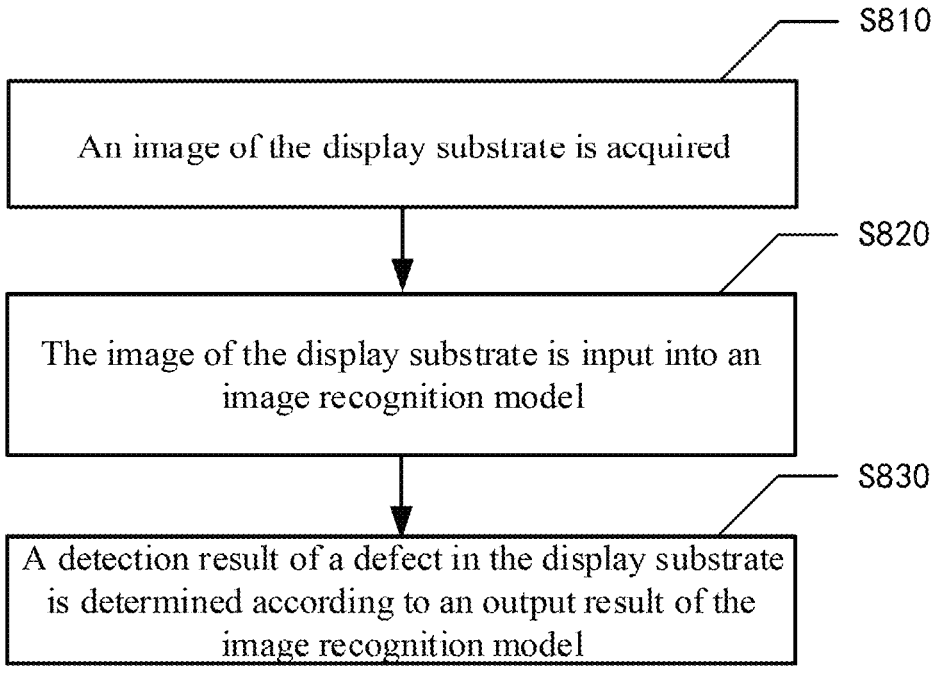

FIG. 8 shows a flowchart of a method of detecting a display substrate according to embodiments of the present disclosure.

Figure 9:
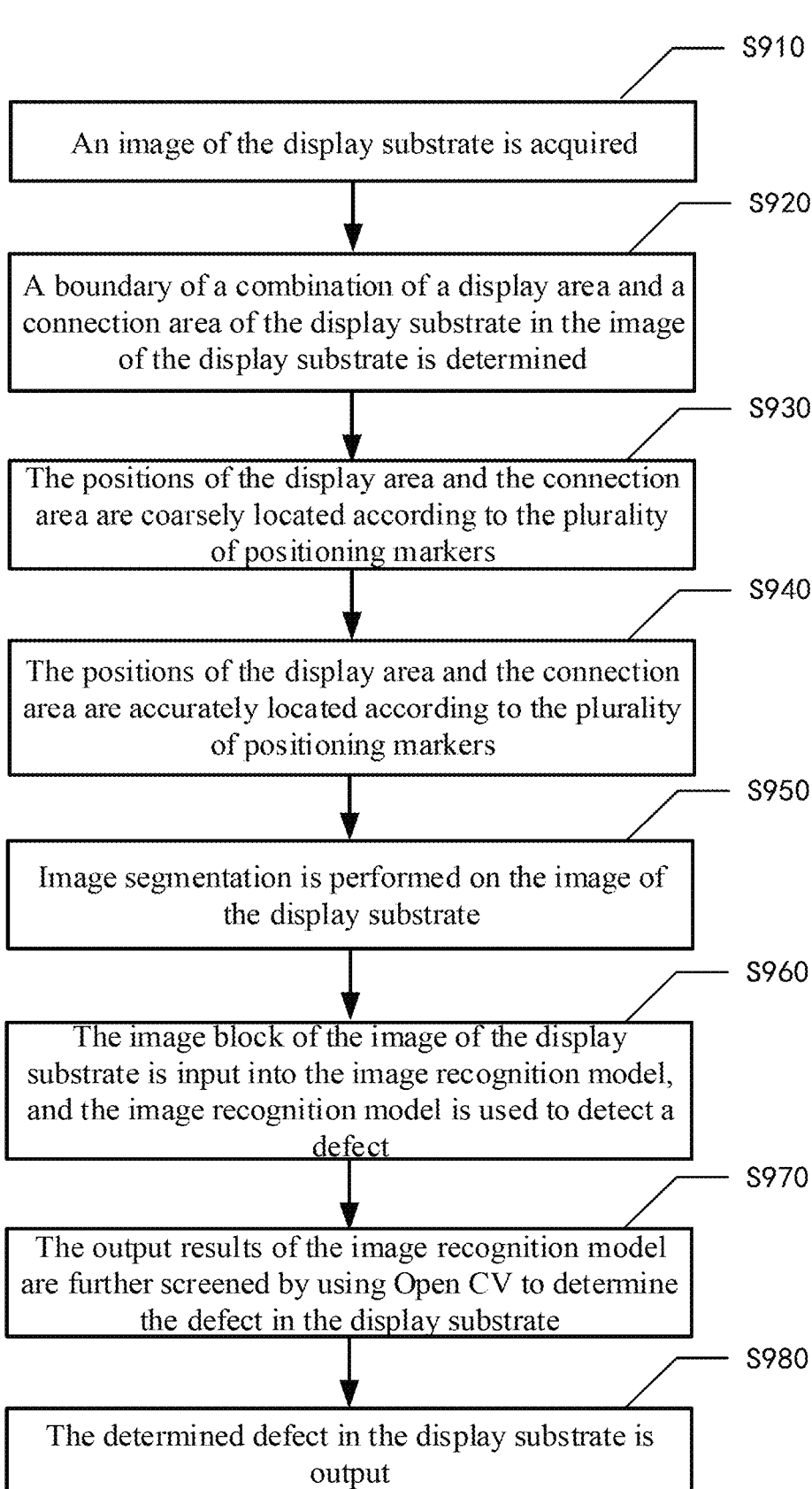

FIG. 9 shows a detailed flowchart of a method of detecting a display substrate according to some exemplary embodiments of the present disclosure.

Figure 10:
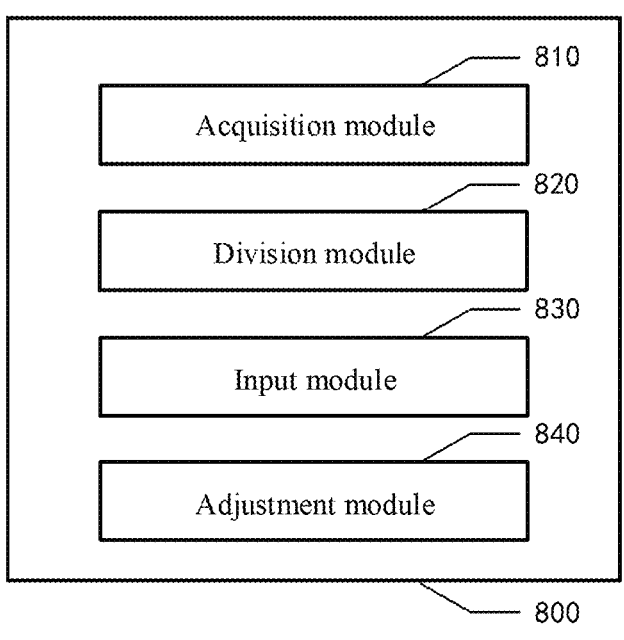

FIG. 10 schematically shows a structural block diagram of an apparatus of training an image recognition model according to embodiments of the present disclosure.

Figure 11:
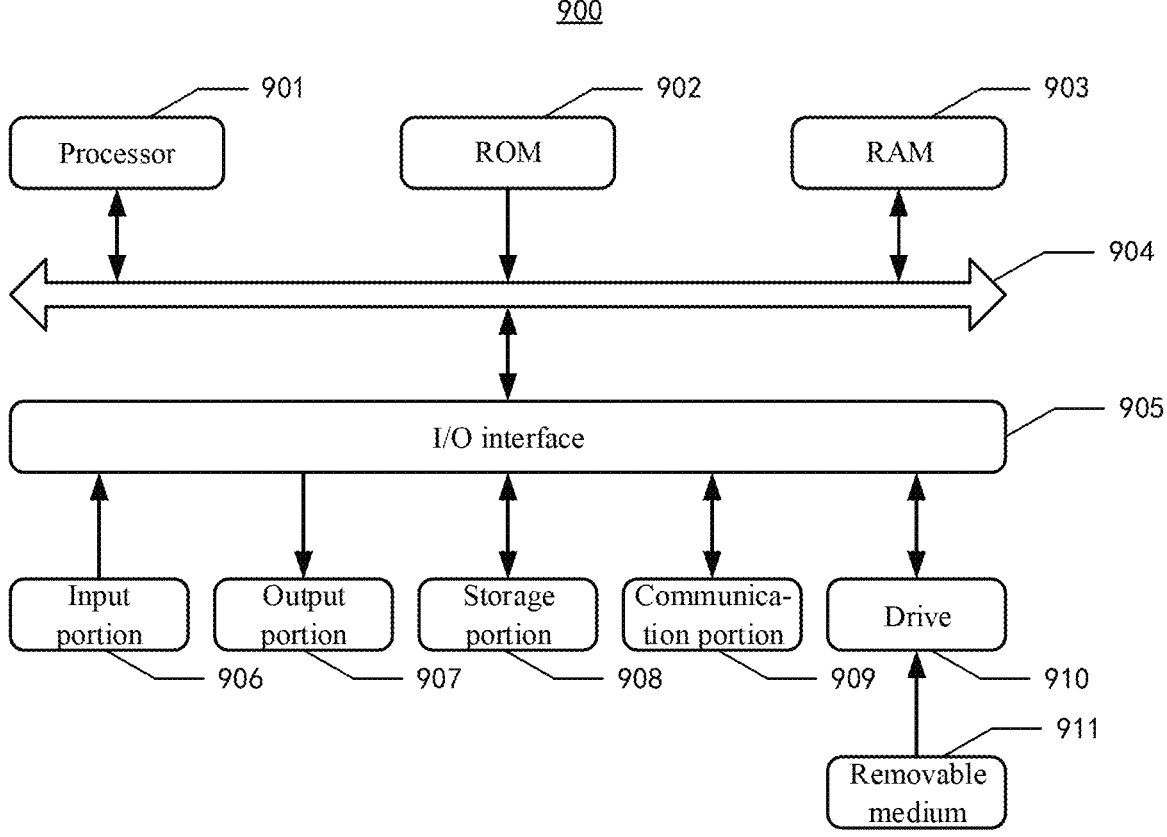

FIG. 11 schematically shows a block diagram of an electronic device adapted to implement a method of training an image recognition model or a method of detecting a display substrate according to embodiments of the present disclosure.

DETAILED DESCRIPTION

The technical solution of the present disclosure is further specifically described below through embodiments and in combination with the accompanying drawings. In the specification, the same or similar reference signs denote the same or similar parts. The following description of embodiments of the present disclosure with reference to the accompanying drawings is intended to explain the general inventive concept of the present disclosure, and should not be construed as limiting the present disclosure.

In addition, in the following detailed descriptions, for purposes of explanation, numerous specific details are set forth in order to provide a thorough understanding of embodiments of the present disclosure. It is obvious, however, that one or more embodiments may be implemented without these specific details.

It should be noted that, although terms "first", "second", etc. may be used herein to describe various parts, components, elements, regions, layers and/or sections, these parts, components, elements, regions, layers and/or sections should not be limited by these terms. Rather, these terms are used to distinguish one part, component, element, region, layer or section from another. Thus, for example, a first part, a first component, a first element, a first region, a first layer, and/or a first section discussed below could be termed a second part, a second component, a second element, a second region, a second layer, and/or a second section without departing from teachings of the present disclosure.

For convenience in description, spatial relationship terms, such as "upper", "lower", "left", "right" and the like, may be used herein to describe a relationship between one element or feature and another element or feature as illustrated in the figures. It will be understood that the spatial relationship terms are intended to encompass different orientations of a device in use or operation in addition to an orientation depicted in the figures. For example, if the device in the figures is turned over, elements described as "below" or "beneath" other elements or features would then be oriented "above" or "over" other elements or features.

As used herein, the terms "substantially", "about", "approximately, "roughly", and other similar terms are used as terms of approximation rather than as terms of degree, and are intended to account for inherent deviations in measured or calculated values that would be recognized by those of ordinary skill in the art. Taking into account factors such as process fluctuations, measurement problems, errors associated with measurement of particular quantities (i.e., limitations of a measurement system), etc., "about" or "approximately" as used herein includes the stated values, and indicates that the particular values are within acceptable tolerances as determined by those of ordinary skill in the art. For example, "about" may mean within one or more standard deviations, or within ±30%, ±20%, ±10% or ±5% of the stated values.

As used herein, Open CV or CV represents a cross platform computer vision and machine learning software library released under the Apache 2.0 license (open source), which may run on Linux, Windows, Android and Mac OS operating systems. It is composed of a series of C functions and a small number of C++ classes, and provides interfaces for languages such as Python, Ruby, and MATLAB, and implements a plurality of common algorithms in image processing and computer vision.

Embodiments of the present disclosure provide a method of training an image recognition model, the image recognition model is used to detect a defect region in an image of a display substrate, the display substrate includes a display area and a connection area, and the method includes: acquiring a first training sample, wherein the first training sample includes images of n display substrates, and n is a positive integer greater than or equal to 1; dividing each of the images of n display substrates into a first sub image and a second sub image, wherein the first sub image is an image of a display area of the display substrate, and the second sub image is an image of a connection area of the display substrate; inputting the first training sample into the image recognition model, wherein the first training sample includes the first sub image and the second sub image; and adjusting at least one feature parameter of the image recognition model to reduce a difference between an output value of the image recognition model and a training value of the first training sample, wherein the image recognition model includes a first parameter and a second parameter, wherein the first parameter is related to a gray scale difference between a normal region and a defect region in the first sub image, the second parameter is related to a gray scale difference between a normal region and a defect region in the second sub image, and the at least one feature parameter includes at least one of the first parameter and the second parameter. In embodiments of the present disclosure, during a training process of the image recognition model, the image of the display substrate is divided into a display area (i.e., AA area) and a connection area (i.e. PAD area), parameters related to the gray scale of the display area and connection area respectively are set, and the parameters are adjusted to achieve a purpose of optimizing the model. In this way, the trained image recognition model may more accurately detect the image of the display substrate and recognize a defect in the display substrate more accurately.

For example, the display device of OLED display device includes an organic luminescent material, and the organic luminescent material is easily affected by water and oxygen, and usually requires thin film packaging. In a manufacturing process of the display device, following process steps are included: tearing off a back film from a lower surface of the cut display substrate and attaching a U-shaped film, i.e., a U-Lami process. During the U-Lami process, defects (also referred to as imperfections) such as "foreign objects, bubbles, and punctures" may occur, and these defects may occur throughout the entire region of the display substrate. In embodiments of the present disclosure, in the U-Lami process, an image acquisition device is provided to take a photo of the display substrate to acquire an image of the display substrate, and then an image recognition model is used to recognize the image of the display substrate to detect various defects that may occur in the display substrate.

For example, the image recognition model may adopt deep learning models such as artificial neural network (ANN), convolutional neural network (CNN), feature pyramid network (FPN), and the like. Herein, the feature pyramid network (FPN) is used as an example to describe embodiments of the present disclosure. It should be understood that embodiments of the present disclosure are not limited to the feature pyramid network (FPN).

Figure 1:
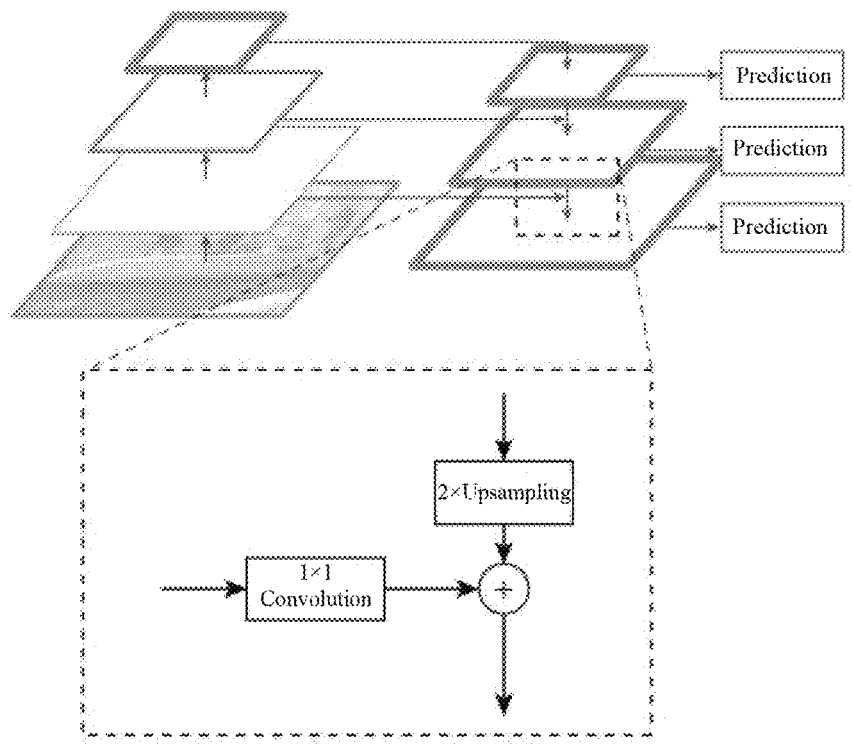
FIG. 1 shows a schematic diagram of a FPN (Feature Pyramid Network) model.

FIG. 1 shows a schematic diagram of a FPN model. In image recognition, low-level feature semantic information is less, but a target location is accurate; high-level feature semantic information is relatively rich, but a target location is relatively rough.

Referring to FIG. 1, in a FPN deep learning algorithm, there is mainly a bottom-up line, a top-down line, and a plurality of horizontal connections.

In the bottom-up line, a bottom-up process is a forward propagation process of the neural network, and a feature map becomes smaller and smaller after convolutional kernel calculation. For example, for ResNets, an output is activated with a feature output by the last residual block of each stage. In the top-down line, a top-down process is to perform upsampling on a higher-level feature map that is more abstract and semantically stronger. Horizontal connection is to merge the upsampling result and the same size feature map generated from bottom up. The features of the two layers that are connected horizontally are identical in spatial dimension so that underlying positioning detail information may be utilized. The low-resolution feature map is upsampled by a factor of 2, and then the upsampling mapping is merged with the corresponding bottom-up mapping by element addition. The process is iterative until a final resolution map is generated.

In an example shown in FIG. 1, the high-level feature is upsampled by a factor of 2 and then combined with the corresponding previous layer feature. The previous layer may be used only after being subjected to a convolutional kernel of 1×1, the purpose is to change the number of channels, which should be the same as the number of channels of the subsequent layer, and the combination method is to perform addition between elements.

Figure 2:
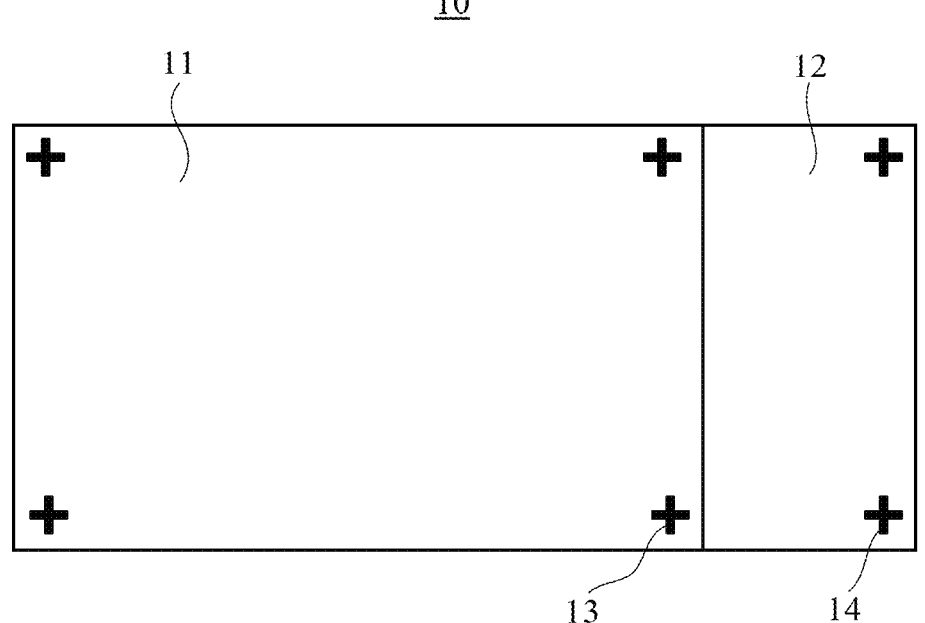
FIG. 2 shows a planar schematic diagram of a display substrate according to embodiments of the present disclosure.

FIG. 2 shows a planar schematic diagram of a display substrate according to embodiments of the present disclosure. Referring to FIG. 2, the display substrate 10 includes a display area (i.e., AA area) 11 and a connection area (i.e., PAD area) 12. The display substrate 10 may further include a plurality of positioning marks arranged on the display substrate 10. For convenience in description, a positioning mark arranged in the display area 11 is described as a first positioning mark 13, and a positioning mark arranged in the connection area 12 is described as a second positioning mark 14.

In embodiments of the present disclosure, the collected image of the display substrate may be divided (e.g., dividing into the display area and the connection area) and marked through an algorithm, and then the defects may be detected by a gray scale difference value from the normal region. For example, the defects include different types, e.g., as a foreign object, a bubble, a puncture, and the like. In embodiments of the present disclosure, during a training process of the image recognition model, the image recognition model may be improved from two directions of parameter sensitivity adjustment and model optimization.

For the direction of parameter sensitivity adjustment, after the image recognition model is constructed, combined a large number of detected and classified defect images, marking and training are performed on the defect features of the defect images in the display area and the connection area, a gray scale difference between the normal region and the defect region is analyzed, and a large number of feature parameters related to the image recognition model are optimized. For example, the feature parameters may include algorithm parameters and ROI (region of interest) parameters, and the like. The algorithm parameters may include display area AI and CV (i.e., computer vision) algorithm switches, display area defect parameters, positioning confidence of display area positioning markers, mean square deviation of foreign object puncture in the display area, a gray scale threshold of a background of the connection area, threshold of defect and fringe from detection range boundary during CV detection, and the like. The ROI parameters may include fine-tuning of the ROI region after selecting the ROI region, a coordinate position of a top left corner of a selection box in a top left corner region, a length and a width of the selection box, and the like.

For the direction of model optimization, images of missed detection may be classified, and then the images of missed detection may be re-input into the image recognition model according to the classification. The image recognition model may be retrained to optimize the image recognition model.

FIG. 3 shows a flowchart of a method of training an image recognition model according to embodiments of the present disclosure. The image recognition model is used to detect a defect region in an image of a display substrate, and the display substrate includes a display area and a connection area. As shown in FIG. 3, a method 300 may include step S310, step S320, step S330, and step S340. According to some embodiments of the present disclosure, some steps of method 300 may be executed separately or in combination, as well as in parallel or sequentially, and are not limited to the specific order of operations shown in FIG. 3.

In step S310, a first training sample is acquired, wherein the first training sample includes images of n display substrates, where n is a positive integer greater than or equal to 1.

It should be understood that in the present disclosure, the expression "a training sample", also known as a training set, is used to fit a model, and train a classification model by setting a parameter of a classifier. For the training samples, the classification results thereof have been pre-labeled, and the pre-labeled classification results are referred to training values.

In step S320, each of the images of n display substrates is divided into a first sub image and a second sub image, wherein the first sub image is an image of a display area of the display substrate, and the second sub image is an image of a connection area of the display substrate.

For example, referring to FIG. 2, the dividing each of the images of n display substrates into a first sub image and a second sub image includes: determining positions of the plurality of first positioning markers 13 and the plurality of second positioning markers 14 in the image of the display substrate; and dividing the image of the display substrate into a first sub image and a second sub image according to the positions of the plurality of first positioning markers 13 and the plurality of second positioning markers 14 in the image of the display substrate.

For example, the plurality of first positioning markers 13 are respectively located at the edge of the display area, and the display area may be determined by frame selection by connecting the plurality of first positioning markers 13, so as to obtain the first sub image. Similarly, the plurality of second positioning markers 14 are respectively located at the edge of the connection area, and the connection area may be determined by frame selection by connecting plurality of second positioning markers 14, so as to obtain the second sub image.

In step S330, the first training sample is input into the image recognition model, wherein the first training sample includes the first sub image and the second sub image.

In step S340, at least one feature parameter of the image recognition model is adjusted to reduce a difference between an output value of the image recognition model and a training value of the first training sample.

It should be understood that a training value of the first training sample may represent information of the (for example, manually) pre-labeled defect in the image of display substrate, such as a category of a detect, a location of a defect, and the like.

For example, the image recognition model includes a first parameter and a second parameter, wherein the first parameter is related to a gray scale difference between a normal region and a defect region in the first sub image, the second parameter is related to a gray scale difference between a normal region and a defect region in the second sub image, and the at least one feature parameter is at least one of the first parameter and the second parameter.

In embodiments of the present disclosure, during the training process of the image recognition model, the image of the display substrate is divided into a display area (i.e., AA area) and a connection area (i.e., PAD area), and parameters (such as the first parameter and the second parameter) related to the gray scale of the display area and connection area respectively are set, and the parameters are adjusted to achieve a purpose of optimizing the model. In this way, the trained image recognition model may more accurately detect the image of the display substrate and recognize a defect in the display substrate more accurately.

For example, the first parameter is calculated according to the following equation:

$$P=a \times R \times OFS$$

P is the first parameter, a is a constant, R is a gray scale mean square deviation ratio of each defect in the image of the display substrate, and OFS is a gray scale difference of each defect in the image block, such as CV edge block or AA area segmentation puncture/foreign object/bubble difference value. For example, the first parameter P may be understood as a gray scale difference between the normal region and the defect region.

When using computer vision technology for image analysis, two steps are typically involved: preprocessing and object detection, and a bridge for communicating the preprocessing and the object detection is image segmentation. The CV edge block here represents an edge block formed when using CV (computer vision) technology to segment the image.

In the exemplary embodiment, a difference degree of the gray difference between the normal region and the defect region is adjusted to improve the sensitivity of the model to defect detection. For example, the smaller the P-value described above, the higher the sensitivity of the model to defect detection.

For example, the second parameter is calculated according to the following equation:

$$Q=QM_1/QM_2$$

Q is the second parameter, $QM_1$ is a gray scale threshold of the defect in the connection area, and $QM_2$ is a gray scale threshold of the background in the connection area. For example, the second parameter Q may be understood as a background threshold weighting factor.

For example, in embodiments of the present disclosure, the connection area may be divided into foreground and background. In a process of model training, feature recognition of the defect type is performed on the connection area by using deep learning multi-layer convolutional networks (such as FPN network) through the data encoding and decoding technology, and then, in Open CV, defect recognition is further performed on the connection area using gray scale values by using Otsu binarization method. For example, the pixel points of the image may be divided into 0-255 bins, and the number of pixel points falling on each bin may be counted, so that the number of pixel points in each bin divided by the total number of pixel points is about 0.9, so that a gray scale image and a binary image may be well separated. The gray scale mean value in the connection area may be determined, and if the gray scale mean value is less than the gray scale threshold of the background in the connection area, it is determined as a defect.

In the exemplary embodiment, the sensitivity of the model to defect detection may be improved by adjusting the background threshold weighting factor through a large number of training samples.

In embodiments of the present disclosure, the algorithm parameters may also be adjusted by adjusting various thresholds.

For example, the at least one feature parameter may further include a boundary threshold parameter, wherein the boundary threshold parameter is used to represent a boundary of a detection region of the display substrate in the image of the display substrate.

In embodiments of the present disclosure, after acquiring an original image of the display substrate, it is necessary to first determine a detection region of the display substrate. For example, for the original image of the display substrate, the complex information of the edge may be cut to prevent the phenomena of positioning interference, algorithm over-detection and the like. Then, in the determined detection region, the detection region may be divided into a display area and a connection area based on identification such as an alignment mark. On this basis, model training and recognition may be performed according to different characteristics of the display area and the connection area, so as to improve the efficiency and accuracy of model training.

FIG. 4 schematically shows a portion of a boundary of a detection region of the display substrate in an image of the display substrate. Referring to FIG. 4, a mark 41 represents a boundary automatically located through positioning marks, and a mark 42 represents the adjusted boundary. By adjusting the boundary, a detection distance between a defect and an upper boundary of the display substrate, i.e., a boundary threshold, may be adjusted, so that the adjusted boundary may include a detection range of the display substrate, thereby avoiding a phenomenon of missing a defect on an outer boundary.

For example, the at least one feature parameter may further include a position parameter of a region of interest, wherein the position parameter includes a coordinate position of at least one vertex of the region of interest in the image of the display substrate, and a length and a width of the region of interest.

FIG. 5 schematically shows a region of interest on an image of the display substrate. Referring to FIG. 5, by adjusting a coordinate position of a vertex at the top left corner of a region selection box 51 (such as a top left corner region selection box), and a length and a width of the top left corner region selection box, a position of the region of interest may be accurately located.

When using computer vision technology for image analysis, two steps are typically involved: preprocessing and object detection, and a bridge for communicating the preprocessing and the object detection is image segmentation. Image segmentation makes images easier to analyze by simplifying or changing the representation of the image. Before image segmentation, preprocessing the image may include binarizing the image. At present, there are many ways to binarize images, and a common method is to use a threshold method for binarization.

For example, a global threshold may be used to binarize the entire image.

In embodiments of the present disclosure, different thresholds may be used for the display area and the connection area to binarize the image. It should be noted that in the present disclosure, expressions such as a gray scale value threshold and a gray scale value difference threshold refer to the thresholds used in a process of image binarization.

For example, before inputting the first training sample into the image recognition model, the method may further include: segmenting the first sub image into a plurality of image blocks and segmenting the second sub image into a plurality of image blocks according to a gray scale value difference threshold, wherein the at least one feature parameter includes the gray scale value difference threshold. For example, the first training sample includes the plurality of image blocks of the first sub image and the plurality of image blocks of the second sub image.

In embodiments of the present disclosure, the gray scale value difference threshold may be determined based on classic binarization threshold determination methods such as Otsu binarization. Then, the image may be binarized based on the determined gray scale value difference threshold, and image segmentation may be performed on the basis of the binarized image, i.e., segmenting into a plurality of image blocks. On this basis, the image blocks are used as the training samples and input into the image recognition model for model training. In this way, the efficiency and accuracy of the image recognition model training may be improved.

For example, the method further includes adjusting the gray scale value difference threshold according to a category of a defect.

In embodiments of the present disclosure, by adjusting the gray scale value difference threshold, an influence of uneven image imaging may be reduced, and a phenomenon that a detection of a defect portion is not obvious may be eliminated.

FIG. 6 shows a partial flowchart of a method of training an image recognition model according to embodiments of the present disclosure. As shown in FIG. 6, the method 300 may further include step S610 and step S620.

In step S610, a second training sample is acquired, wherein the second training sample includes images of m display substrates, m is a positive integer greater than or equal to 1, and the images of m display substrates are images of missed detection of the image recognition model.

In step S620, the second training sample is input into the image recognition model to optimize the image recognition model.

For example, the step S620 may include: inputting the second training sample into the image recognition model; and adjusting a training parameter of the image recognition model to optimize the image recognition model, wherein the training parameter includes at least one of: a number of training samples input into the image recognition model each time, and a number of cycles during a training process.

In embodiments of the present disclosure, the image recognition model may be optimized through the second training sample. Specifically, optimization may be performed on the basis of the existing FPN algorithm. For example, training parameters may be adjusted, and the training parameters may include training batches and a number of cycles (i.e., epochs) involved. Batch refers to a batch of training samples input into the image recognition model each time, and batch size refers to a number of training samples in each batch. Selecting an appropriate batch size allows the model to achieve a best balance between memory capacity and memory efficiency, so as to optimize the performance and speed of the model.

Optionally, before step S610, the images in the second training sample may be classified and preprocessed.

FIG. 7 shows a partial flowchart of a method of training an image recognition model according to embodiments of the present disclosure. As shown in FIG. 7, the method 300 may further include step S710 and step S720.

In step S710, the images of m display substrates in the second training sample are classified according to a reason for missed detection. That is, step S710 is the above-mentioned classification step. For example, the reason for missed detection of the missed image may be analyzed to determine a category of the reason for missed detection. For example, the category of the reason for missed detection may include: unstable device imaging, unrecognizable picture, surface contamination of the display substrate, weak puncture, etc.

In step S720, missed defects are marked differently in the images of m display substrates according to categories of the images of m display substrates. For example, peripheral marking may be performed for each category of missed detection, and a line segment or a rectangle may be selected. For example, for a category of unrecognizable picture, a line segment may be used for marking; for a category of surface contamination, a rectangle may be used for marking; and for a category of weak puncture, a triangle may be used for marking.

For example, the method 300 may further include: comparing a gray scale value of the missed defect with a gray scale value of the normal region and comparing a gray scale value of the missed defect with a gray scale value of the defect region according to the categories of the images of m display substrates; and adjusting the training parameter of the image recognition model according to a result of the comparison, wherein the training parameter includes a gray scale threshold for image segmentation. For example, for a missed defect such as a weak puncture, a gray scale value of the region where the weak puncture is located in the image may be compared with a gray scale value of the normal region, and a gray scale value of the missed defect in the image may be compared with a gray scale value of the region where the puncture has already been detected. Through such comparisons, the gray scale value of the missed defect may be accurately determined. In this way, in a process of determining a gray scale value difference threshold based on classic binarization threshold determination methods such as Otsu binarization, the threshold may be adjusted based on the comparison results, so that the determination of the threshold may more accurately reflect the gray scale value difference between the normal region and the defect region (including the missed defect region). On this basis, subsequent image segmentation and image recognition may be more accurate.

FIG. 8 shows a flowchart of a method of detecting a display substrate according to embodiments of the present disclosure. The method of detecting a display substrate may utilize the image recognition model obtained by the above-mentioned method to detect a defect in the display substrate. By using the above-mentioned image recognition model, the accuracy of detection may be improved, so that a situation of the missed defects in the display substrate may be avoided. As shown in FIG. 8, a detection method 800 may include step S810, step S820, and step S830.

In step S810, an image of the display substrate is acquired.

In step S820, the image of the display substrate is input into an image recognition model, wherein the image recognition model is obtained according to the training method of the above-mentioned embodiments.

In step S830, a detection result of a defect in the display substrate is determined according to an output result of the image recognition model.

FIG. 9 shows a detailed flowchart of a method of detecting a display substrate according to some exemplary embodiments of the present disclosure. As shown in FIG. 9, a detection method 900 may include step S910 to step S980.

In step S910, an image of the display substrate is acquired.

In step S920, a boundary of a detection region of the display substrate in the image of the display substrate is determined. For example, an edge feature enhancement algorithm may be used to determine the boundary of the detection region of the display substrate in the image of the display substrate.

In step S930, the positions of the display area and the connection area are coarsely located according to the plurality of positioning markers.

In step S940, the positions of the display area and the connection area are accurately located according to the plurality of positioning markers.

In step S950, image segmentation is performed on the image of the display substrate. For example, existing image segmentation algorithms may be used for small block cutting, each small block may include 512×512 pixels. For example, for a portion less than 512 pixels, an overlapping processing may be performed with an adjacent region.

In step S960, the image block of the image of the display substrate is input into the image recognition model, wherein the image recognition model is obtained according to the training method of the above-mentioned embodiments; and the image recognition model is used to detect a defect.

In step S970, the output results of the image recognition model are further screened by using Open CV to determine the defect in the display substrate.

In step S980, the determined defect in the display substrate is output.

Based on the method of training an image recognition model described above, embodiments of the present disclosure further provide an apparatus of training an image recognition model. The apparatus will be described in detail below in conjunction with FIG. 10.

FIG. 10 schematically shows a structural block diagram of an apparatus of training an image recognition model according to embodiments of the present disclosure.

As shown in FIG. 10, the apparatus 800 of training an image recognition model in the embodiment includes an acquisition module 810, a division module 820, an input module 830, and an adjustment module 840.

The acquisition module 810 is used to acquire a first training sample, wherein the first training sample includes images of n display substrates, where n is a positive integer greater than or equal to 1. In an embodiment, the acquisition module 810 may be used to perform step S310 described above, which will not be described in detail here.

The division module 820 is used to divide each of the images of n display substrates into a first sub image and a second sub image, wherein the first sub image is an image of a display area of the display substrate, and the second sub image is an image of a connection area of the display substrate. In an embodiment, the division module 820 may be used to perform step S320 described above, which will not be described in detail here.

The input module 830 is used to input the first training sample into the image recognition model. In an embodiment, the input module 830 may be used to perform step S330 described above, which will not be described in detail here.

The adjustment module 840 is used to adjust at least one feature parameter of the image recognition model to reduce a difference between an output value of the image recognition model and a training value of the first training sample. In an embodiment, the partitioning module 840 may be used to perform step S340 described above, which will not be described in detail here.

For example, the image recognition model includes a first parameter and a second parameter, wherein the first parameter is related to a gray scale difference between a normal region and a defect region in the first sub image, the second parameter is related to a gray scale difference between a normal region and a defect region in the second sub image, and the at least one feature parameter includes at least one of the first parameter and the second parameter.

According to embodiments of the present disclosure, any number of the acquisition module 810, the division module 820, the input module 830, and the adjustment module 840 may be combined into one module to be implemented or any one of the modules may be divided into a plurality of modules. Alternatively, at least part of the function of one or more of these modules may be combined with at least part of the function of other modules and implemented in one module. According to embodiments of the present disclosure, at least one of the acquisition module 810, the division module 820, the input module 830, and the adjustment module 840 may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by any other reasonable means of hardware or firmware that integrates or packages a circuit, or may be implemented in any one of or a suitable combination of three implementation methods of software, hardware and firmware. Alternatively, at least one of the acquisition module 810, the division module 820, the input module 830, and the adjustment module 840 may be implemented at least partially as a computer program module, which when executed, may perform a corresponding function.

FIG. 11 schematically shows a block diagram of an electronic device adapted to implement a method of training an image recognition model or a method of detecting a display substrate according to embodiments of the present disclosure.

As shown in FIG. 11, the electronic device 900 according to embodiments of the present disclosure includes a processor 901 that may perform various appropriate actions and processes according to programs stored in a read-only memory (ROM) 902 or programs loaded from a storage portion 908 into a random access memory (RAM) 903. The processor 901 may include, for example, a general-purpose microprocessor (e.g., a CPU), an instruction set processor and/or a related chipset and/or a special-purpose microprocessor (e.g., an application-specific integrated circuit (ASIC)), etc. The processor 901 may also include an on-board memory for caching purposes. The processor 901 may include a single processing unit or a plurality of processing units for performing different actions of a method flow according to embodiments of the present disclosure.

In the RAM 903, various programs and data required for the operation of the electronic device 900 are stored. The processor 901, the ROM 902 and the RAM 903 are connected to each other through a bus 904. The processor 901 performs various operations of the method flow according to embodiments of the present disclosure by executing the programs in the ROM 902 and/or the RAM 903. It should be noted that the programs may also be stored in one or more memories other than the ROM 902 and the RAM 903. The processor 901 may also perform various operations of the method flow according to embodiments of the present disclosure by executing the programs stored in the one or more memories.

According to embodiments of the present disclosure, the electronic device 900 may also include an input/output (I/O) interface 905, and the input/output (I/O) interface 905 is also connected to the bus 904. The electronic device 900 may also include one or more of the following components connected to the I/O interface 905: an input portion 906 including a keyboard, a mouse, etc.; an output portion 907 including a cathode ray tube (CRT), a liquid crystal display (LCD), etc., and a speaker, etc.; a storage portion 908 including a hard disk, etc.; and a communication portion 909 including a network interface card such as a LAN card, a modem, etc. The communication portion 909 performs communication processing via a network such as the Internet. A drive 910 is also connected to the I/O interface 905 as needed. A removable medium 911, such as a magnetic disk, an optical disk, a magneto-optical disk, a semiconductor memory, etc., is mounted on the drive 910 as needed so that a computer program read therefrom is installed into the storage portion 908 as needed.

The present disclosure further provides a non-transitory computer readable storage medium. The computer-readable medium may be included in the device/apparatus/system described in the above-mentioned embodiments, and may also exist alone without being assembled into the device/apparatus/system. The computer-readable medium described above carries one or more programs, and when the one or more programs are executed, the method according to embodiments of the present disclosure may be implemented.

According to embodiments of the present disclosure, the computer-readable medium may be a nonvolatile computer-readable storage medium. The computer-readable storage medium may include, for example, but are not limited to, a portable computer disk, a hard disk, a random access memory (RAM), a read only memory (ROM), an erasable programmable read only memory (EPROM or flash memory), a portable compact disk read only memory (CD- ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. For example, according to embodiments of the present disclosure, the computer-readable medium may include one or more memories other than the ROM 902 and/or the RAM 903 and/or the ROM 902 and the RAM 903 described above.

Embodiments of the present disclosure further include a computer program product which includes a computer program. The computer program includes program code for implementing the method shown in the flowchart. When the computer program product runs on a computer system, the program code is used to enable the computer system to implement the method provided by embodiments of the present disclosure.

The computer program, when executed by the processor 901, performs the functions described above defined in the system/apparatus of embodiments of the present disclosure. According to embodiments of the present disclosure, the system, device, apparatus, module, unit, etc. described above may be implemented by the computer program module.

In an embodiment, the computer program may rely on a tangible storage media such as an optical storage device and a magnetic storage device. In another embodiment, the computer program may also be transmitted and distributed in a form of signals on a network media, downloaded through the communication section 909 and installed, and/or installed from the removable medium 911. The program code contained in the computer program may be transmitted by any appropriate network medium, including but not limited to: wireless, wired, etc., or any suitable combination of the above.

In such an embodiment, the computer program may be downloaded from the network via the communication portion 909 and installed, and/or installed from the removable medium 911. The computer program, when executed by the processor 901, performs the functions described above defined in the system of embodiments of the present disclosure. According to embodiments of the present disclosure, the system, device, apparatus, module, unit, etc. described above may be implemented by the computer program module.

According to embodiments of the present disclosure, program codes for implementing the computer programs provided by embodiments of the present disclosure may be written in one programming language or any combination of more programming languages. Specifically, the computing programs may be implemented using advanced procedure-oriented and/or object-oriented programming languages, and/or assembler/machine languages. Programming languages include but are not limited to Java, C++, Python, "C" or similar programming languages. The program codes may be executed entirely on a user computing device, partially on a user device and partially on a remote computing device, or entirely on a remote computing device or server. In situations involving the remote computing device, the remote computing device may be connected to the user computing device through any kind of network, including a local area network (LAN) or a wide area network (WAN), or the user computing device may be connected to an external computing device (for example, using an Internet service provider to connect via the Internet).

The flowcharts and block diagrams in the drawings illustrate the architecture, functionality, and operation of possible implementations of systems, methods and computer program products according to various embodiments of the present disclosure. In this regard, each block in the flowcharts or block diagrams may represent a module, program segment, or portion of code, which contains one or more executable instructions for implementing the specified logical function. It should also be noted that, in some alternative implementations, the functions noted in the blocks may occur out of the order noted in the drawings. For example, two blocks shown in succession may, in fact, be executed substantially concurrently, or the two blocks may sometimes be executed in a reverse order, depending upon the functionality involved. It should also be noted that each block of the block diagrams or flowcharts, and combinations of the blocks in the block diagrams or flowcharts, may be implemented by using a special purpose hardware-based system that performs the specified functions or operations, or may be implemented using a combination of a special purpose hardware and computer instructions.

Those skilled in the art will appreciate that features recited in the various embodiments of the present disclosure and/or the claims may be combined and/or incorporated in a variety of ways, even if such combinations or incorporations are not clearly recited in the present disclosure. In particular, the features recited in the various embodiments of the present disclosure and/or the claims may be combined and/or incorporated without departing from the spirit and teachings of the present disclosure, and all such combinations and/or incorporations fall within the scope of the present disclosure.

Embodiments of the present disclosure have been described above. However, these embodiments are for illustrative purposes only, and are not intended to limit the scope of the present disclosure. Although the various embodiments are described above separately, this does not mean that the measures in the various embodiments may not be advantageously used in combination. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A method of detecting a display substrate, comprising:
acquiring an image of the display substrate;
inputting the image of the display substrate into an image recognition model, and detecting, by the image recognition model, a defect in the display substrate; and
determining a detection result of a defect in the display substrate according to an output result of the image recognition model,
wherein the image recognition model is configured to detect a defect region in an image of a display substrate, the display substrate comprises a display area and a connection area, and the image recognition model is obtained by
acquiring a first training sample, wherein the first training sample comprises images of n display substrates, and n is a positive integer greater than or equal to 1;
dividing each of the images of n display substrates into a first sub image and a second sub image, wherein the first sub image is an image of a display area of the display substrate, and the second sub image is an image of a connection area of the display substrate;
inputting the first training sample into the image recognition model, wherein the first training sample comprises the first sub image and the second sub image; and
adjusting at least one feature parameter of the image recognition model to reduce a difference between an output value of the image recognition model and a training value of the first training sample,
wherein the image recognition model comprises a first parameter and a second parameter, wherein the first parameter is related to a gray scale difference between a normal region and a defect region in the first sub image, the second parameter is related to a gray scale difference between a normal region and a defect region in the second sub image, and the at least one feature parameter comprises at least one of the first parameter and the second parameter, and
wherein adjusting the at least one feature parameter of the image recognition model comprises: respectively adjusting the first parameter and the second parameter.

2. The method according to claim 1, wherein the method further comprises:
acquiring a second training sample, wherein the second training sample comprises images of m display substrates, m is a positive integer greater than or equal to 1, and the images of m display substrates are images of missed detection of the image recognition model; and
inputting the second training sample into the image recognition model to optimize the image recognition model.

3. The method according to claim 2, wherein the inputting the second training sample into the image recognition model to optimize the image recognition model comprises:
inputting the second training sample into the image recognition model; and
adjusting a training parameter of the image recognition model to optimize the image recognition model,
wherein the training parameter comprises at least one of: a number of training samples input into the image recognition model each time, and a number of cycles during a training process.

4. The method according to claim 3, wherein before the inputting the second training sample into the image recognition model, the method further comprises:
classifying the images of m display substrates in the second training sample according to a reason for missed detection; and
marking missed defects differently in the images of m display substrates according to categories of the images of m display substrates.

5. The method according to claim 3, wherein the method further comprises:
comparing a gray scale value of the missed defect with a gray scale value of the normal region and comparing a gray scale value of the missed defect with a gray scale value of the defect region according to categories of the images of m display substrates; and
adjusting the training parameter of the image recognition model according to a result of the comparison, wherein the training parameter comprises a gray scale threshold for image segmentation.

6. The method according to claim 1, wherein the at least one feature parameter further comprises a boundary threshold parameter, the boundary threshold parameter is configured to represent a boundary of a detection region of the display substrate in the image of the display substrate, and the detection region comprises a display area and a connection area of the display substrate.

7. The method according to claim 1, wherein the at least one feature parameter further comprises a position parameter of a region of interest, wherein the position parameter comprises a coordinate position of at least one vertex of the region of interest in the image of the display substrate, and a length and a width of the region of interest.

8. The method according to claim 1, wherein the first parameter is calculated by:

$$P = a \times R \times OFS,$$

where P is the first parameter, a is a constant, R is a gray scale mean square deviation ratio of each defect in the image of the display substrate, and OFS is a gray scale difference value of a defect in each image block.

9. The method according to claim 1, wherein the second parameter is calculated by:

$$Q = QM1 / QM2,$$

where Q is the second parameter, QM1 is a gray scale threshold of a defect in the connection area, and QM2 is a gray scale threshold of a background in the connection area.

10. The method according to claim 1, wherein the display substrate further comprises a plurality of first positioning markers arranged in the display area and a plurality of second positioning markers arranged in the connection area, wherein the dividing each of the images of n display substrates into a first sub image and a second sub image comprises:

determining positions of the plurality of first positioning markers and positions of the plurality of second positioning markers in the image of the display substrate; and dividing the image of the display substrate into the first sub image and the second sub image according to the positions of the plurality of first positioning markers and the positions of the plurality of second positioning markers in the image of the display substrate.

11. The method according to claim 1, wherein before the inputting the first training sample into the image recognition model, the method further comprises: segmenting the first sub image into a plurality of image blocks and segmenting the second sub image into a plurality of image blocks according to a gray scale value difference threshold, wherein the at least one feature parameter comprises the gray scale value difference threshold; and wherein the first training sample comprises the plurality of image blocks of the first sub image and the plurality of image blocks of the second sub image.

12. The method according to claim 11, wherein the method further comprises adjusting the gray scale value difference threshold according to a category of a defect.

13. An electronic device, comprising:

one or more processors; and a storage apparatus configured to store one or more programs, wherein the one or more programs, when executed by the one or more processors, cause the one or more processors to implement the method according to claim 1.

14. A non-transitory computer readable storage medium having executable instructions stored thereon, wherein the instructions, when executed by a processor, cause the processor to implement the method according to claim 1.

* * * * *